United States Patent
Liu (12) 
(10) Patent No.: US 6,438,220 B1
(45) Date of Patent: Aug. 20, 2002

(54) METHOD AND APPARATUS FOR INTERNET-BASED TELEPHONE ACCESS TO PREPAID CARD AND PIN SYSTEMS

(75) Inventor: Yali Liu, Richardson, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/538,708

(22) Filed: Mar. 30, 2000

(51) Int. Cl.[7] .................. H04M 15/00; H04M 17/00
(52) U.S. Cl. ............ 379/144.01; 379/111; 379/114.01; 379/114.15; 379/114.17; 379/114.19; 379/114.2
(58) Field of Search ................... 379/111, 112.01, 379/114.01, 114.03, 114.05, 114.15, 114.17, 114.18, 114.19, 114.2, 144.01, 144.05; 370/352, 353, 354

(56) References Cited

U.S. PATENT DOCUMENTS

| | | | |
|---|---|---|---|
| 5,991,381 A | | 11/1999 | Bouanaka et al. |
| 6,005,845 A | * | 12/1999 | Svennesson et al. ......... 370/260 |
| 6,097,804 A | * | 8/2000 | Gilbert et al. .............. 379/230 |
| 6,104,704 A | | 8/2000 | Buhler et al. |
| 6,137,869 A | | 10/2000 | Voit et al. |
| 6,188,752 B1 | * | 2/2001 | Lesley ...................... 379/114 |
| 6,208,642 B1 | * | 3/2001 | Balachandran et al. ...... 370/385 |
| 6,282,566 B1 | * | 8/2001 | Lee, Jr. et al. .............. 709/217 |
| 6,295,292 B1 | * | 9/2001 | Voit et al. ................... 370/352 |
| 6,310,943 B1 | * | 10/2001 | Kowalski ................ 379/127.03 |
| 6,320,947 B1 | * | 11/2001 | Joyce et al. ............ 379/144.01 |
| 6,335,968 B1 | * | 1/2002 | Malik ...................... 379/114.2 |

FOREIGN PATENT DOCUMENTS

| | | |
|---|---|---|
| EP | 0 866 596 A2 | 9/1998 |
| WO | 97/14238 | 4/1997 |
| WO | WO 98/21874 | 5/1998 |
| WO | WO 99/33285 | 7/1999 |

\* cited by examiner

Primary Examiner—Curtis Kuntz
Assistant Examiner—Quoc Tran (57) ABSTRACT

A method for providing a pre-paid telephone calling card services to a calling party initiating a voice-based connection to a called party telephone using an internet-based IP Phone process running on a personal computer. The method comprises initiating an A-leg connection between the IP Phone process and an internet gateway utilizing a computer network connecting the personal computer and the internet Gateway, establishing a telephone connection between the internet gateway and a SCP. Once this connection is established, the SCP transmits a request to the calling party through the IP Phone process to provide account and call information. The calling party responds with the requested account and call information using the IP Phone process. The internet gateway then transmits the information to the SCP using DTMF tones. The SCP responds by transmitting an account query from the SCP to verify account and balance information for the calling party. If the account data is successfully verified, a B-leg connection is established between the SCP and the called party telephone and the A-leg and B-leg connections are connected in order to establish the voice-based connection between the calling party and the called party telephone.

17 Claims, 4 Drawing Sheets

METHOD AND APPARATUS FOR INTERNET-BASED TELEPHONE ACCESS TO PREPAID CARD AND PIN SYSTEMS

BACKGROUND

1. Field of the Invention

This invention relates in general to internet-based telephone access to prepaid card and pin systems, and more particularly to permitting a caller to originate a voice-based telephone call from a device attached to the internet and call any telephone number attached to a public switched telephone network (PSTN) while using prepaid card/support services.

2. Related Art

Figure 1:
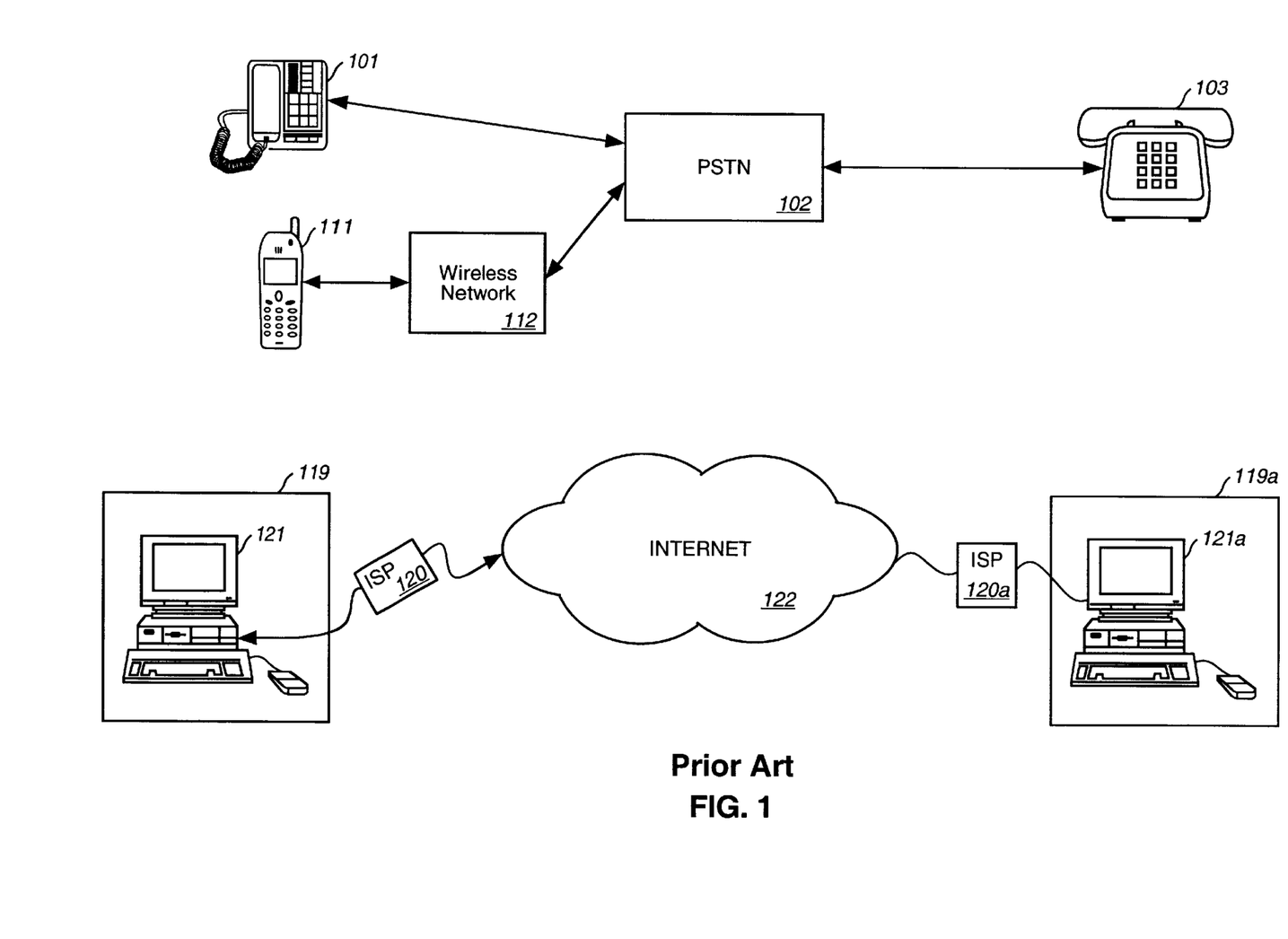
FIG. 1 illustrates a voice-based telecommunications system that may be used with an embodiment of the present invention.

Referring to FIG. 1, currently calling parties only use a standard voice-only telephone 101 to access pre-paid calling card/support services when making a call through a PSTN 102. This procedure may be expensive, especially when the calling party is making an international call. When a caller is calling within U.S., a local telephone phone company typically charges an access fee to telecommunications service providers providing calling card services for the call to a calling card communication system. This initial call is typically referred to as an A-leg of a calling card call.

An alternate way of making this call includes wireless calls made to the calling card communication systems. Calls using a wireless telephone 111 are made through a wireless network 112 that will likely incur costs associated with both making the A-leg call as well as a similar access fee in addition to the fee charges for land-line based calls. Increasingly, calling parties are able to make voice-based telephone calls that are initiated using a personal computer (PC) 121 over the internet 122. These internet-based phone calls are not convenient for many callers, because an internet-based call typically requires a called party to turn on his or her PC and have it connected to the internet before the call may be initiated. Additionally, the calling party typically cannot place a call to a standard voice-only telephone number 103.

The standard voice-only telephone 101 also presents a user with difficulty when entering any information other than number, e.g. it is very difficult to enter an address and a person's name. Systems connecting with a standard voice-only telephone 101 typically depend on an operator service or a voice recognition system to permit input of additional information from a standard voice-only telephone. Both of these solutions to permitting input of non-numeric data are expensive to telecommunications providers and not user friendly to the calling party. However, calling card systems typically require the input of non-numeric data to set up a customer's account as well as add additional funds to an existing pre-paid calling card. This non-numeric information includes customer name, customer address, telephone numbers, and credit card information needed to permit billing of the cost for the calling card. The standard voice-only telephone 101 is very difficult to use to retrieve the text information; such telephones usually rely upon expensive Text to Speech hardware and software to convert the text to audio that is played to the caller.

SUMMARY

An internet gateway may be utilized to bridge an internet-based telephone connection to a prepaid Card/Support PIN system while addressing the above problems. It eliminates the cost of the A-leg as the calling party only needs to pay the cost of the connection from the Gateway to the called party. This connection is typically called a B-leg. Because there is no A-Leg outside of telecommunication service provider's network, the provider does not need to pay the access fee to the local phone company. The internet user may call any number attached to a PSTN. The internet gateway permits the calling party using the internet telephone running on a PC connection to easily enter and retrieve any text information using a web browser, such as address and name without any human intervention and any expensive Text to Speech or Speech Recognition Hardware and Software.

The present invention provides pre-paid telephone calling card services to a calling party using an internet-based IP Phone process running on a personal computer. Using this IP Phone process, the calling party can initiate a voice-based call to a called party's telephone. The method comprises initiating an A-leg connection between the IP Phone process and an internet gateway utilizing a computer network that connects the personal computer and the internet gateway; establishing a telephone connection between the internet gateway and a Service Control Point ("SCP") wherein the SCP is coupled to a public switched telephone network; transmitting a request by the SCP to the calling party through the IP Phone process to provide account and call information; receiving account and call information using the internet gateway from the IP Phone process; transmitting the information to the SCP using the internet gateway; transmitting an account query from the SCP to verify account and balance information for the calling party; if the account data is successfully verified, establishing a B-leg connection between the SCP and the called party telephone and connecting the A-leg and B-leg connection to establish the voice-based connection between the calling party and the called party.

A system in accordance with the principles of the present invention comprises a means for initiating an A-leg connection between the IP Phone process and an internet gateway utilizing a computer network connecting the personal computer and the internet gateway, means for establishing a telephone connection between the internet gateway and a SCP, the SCP is coupled to a public switched telephone network, means for transmitting a request by the SCP to the calling party through the IP Phone process to provide account and call information, means for receiving account and call information by the internet gateway from the IP Phone process, means for generating DTMF tones corresponding to ASCII characters received from the IP Phone process within the internet gateway, means for transmitting the DTMF tones from the internet gateway to the SCP, means for transmitting a query by the SCP to the Service Data Point ("SDP"), the query comprises an account number and a personal identification number, means for comparing the account number and personal identification number with an account database coupled to the SDP, means for verifying the account and balance information if the received account number and personal identification number matches the corresponding items within the database and the database possess a positive balance value, if the account data is successfully verified, means for establishing a B-leg connection between the SCP and the called party telephone; and means for connecting the A-leg and B-leg connection to establish the voice-based connection between the calling party and the called party telephone.

Other embodiments of a system in accordance with the principles of the invention may include alternate or optional additional aspects. One such aspect of the present invention is a method comprising initiating an A-leg connection from the IP Phone process and an internet gateway utilizing a computer network connecting the personal computer and the internet gateway, the internet gateway responds by establishing a telephone connection between the internet gateway and a SCP, the SCP is coupled to a public switched telephone network, receiving a request from the SCP to the calling party through the IP Phone process to provide account and call information, transmitting account and call information to the internet gateway by the IP Phone process, the internet gateway responds to receipt of account and call information by generating DTMF tones corresponding to ASCII characters received from the IP Phone and transmitting the DTMF tones to the SCP, causing the SCP to transmit a query to a SDP, the query comprises an account number and a personal identification number, the SDP responds to the query by comparing the account number and personal identification number with an account database coupled to the SDP and verifying the account and balance information if the received account number and personal identification number matches the corresponding items within the account database and the account database possess a positive balance value, and if the account data is successfully verified, causing the establishment of a B-leg connection between the SCP and the called party telephone, the SCP responds to the establishment of the B-leg connection by connecting the A-leg and B-leg connections in order to establish the voice-based connection between the calling party and the called party telephone.

BRIEF DESCRIPTION OF THE DRAWINGS

Referring now to the drawings in which like reference numbers represent corresponding parts throughout.

DETAILED DESCRIPTION

The embodiments of the invention described herein are implemented as logical operations in a telecommunications system having connections to a distributed network, such as an internet. The logical operations are implemented as a sequence of computer implemented steps running on a computer system and as interconnected machine modules running within the computing system. This implementation is a matter of choice dependent on the performance requirements of the computing system implementing the invention. Accordingly, the logical operations described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims.

Figure 2:
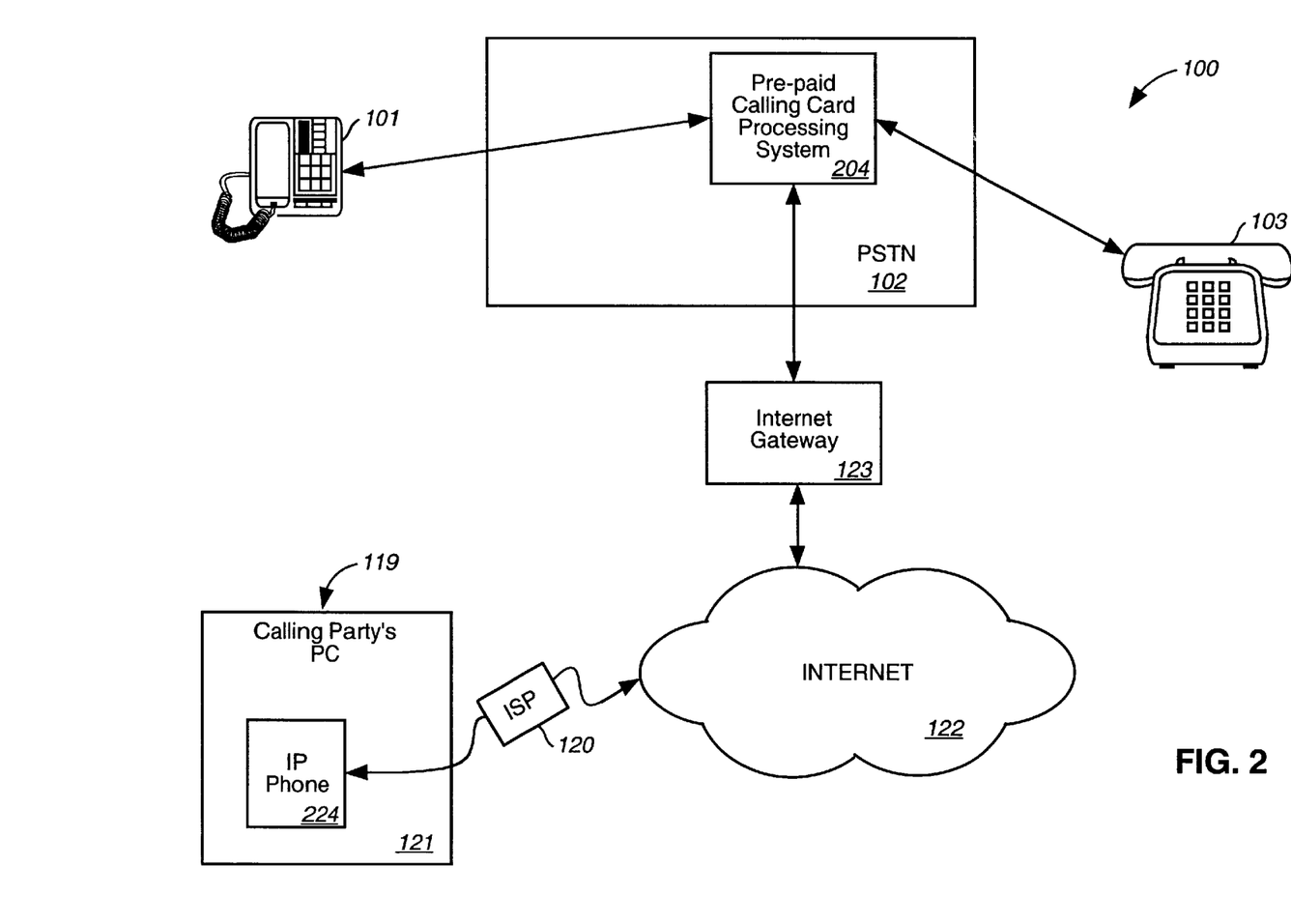
FIG. 2 illustrates a voice-based telecommunications system comprising a pre-paid calling card processing system according to another embodiment of the present invention.

Now referring to FIG. 2, a communication system 100 comprising a PSTN 102 and a pre-paid calling card processing system 204 is used to connect a calling party 101 to a called party 103. The communication system 100 also permits a calling party 101 to establish a voice-based connection to the called party 103 using an internet-based telephone system. The first type of connection is initiated when the calling party 101 calls the calling party processing system to establish an A-leg portion of the call. The A-leg connections are typically established by the calling party 101 placing a call to a toll-free number (800 or 888 number). The calling party 101 interacts with the calling card processing system 204 to establish a connection to the called party 103. This interaction with the calling card processing system 204 includes providing the calling card processing system with an account number, a personal identification number (PIN), and a telephone number for the called party 103 on PSTN 102. The calling card processing system 204 verifies the calling party's information and establishes a B-leg connection to the called party 103.

An internet-based call is established in a similar manner. The calling party 119 establishes a local connection to an internet service provide (ISP) 120 using a personal computer ("PC") 121. The calling party 119 may use any number of different ISPs when establishing these connections in order to minimize or eliminate the costs associated with the A-leg connections. When a calling party travels, he or she may connect to an ISP in one city and to a second ISP in another city.

Once a connection to the internet 122 is established, the call is routed to an internet gateway 123. The calling party 119 typically initiates a call using an internet telephone system 224. The internet telephone system 224 may be a standalone application, or can be launched as an ActiveX/Applet from a Web server located in the internet gateway 123. Any H.323 or SIP standards-compliant client (the client is defined as one which has been approved in an IMTC Interoperability event) may be used as the IP Phone software 224. Some current examples are Microsoft NetMeeting, Intel internet Phone, and Voxware Televox. Other clients from NetSpeak, Lucent, Netscape, and Vocaltec are expected to be H.323 compliant now or in the future.

The internet gateway 123 may be reached using a standard internet protocol ("IP") address to establish the A-leg connection for the internet telephone system 224 running on the PC 121. The A-leg connection from the PC 121 to the calling card processor 204 across the internet 122 will utilize any communications protocol that supports internet based voice connections, such as H.323, to communicate between the PC 121 and the internet gateway 123. The internet gateway 123 converts the PSTN-based voice connection data used to communicate over the PSTN 102 to/from the digitized packet-based voice data used by the internet telephone software system 224 running on the PC 121. The internet gateway 123 establishes a communications connection with the calling card processing system 204 and communicates with the calling card processing system 204 to perform the account verification and B-leg processing as discussed above.

Once the B-leg connection is established to the called party 103, communications will occur between the calling party 119 using PC 121 and the called party 103 through a PSTN 102 and the internet 122, which are connected together using the internet gateway 123. The internet gateway 123 communicates the account, PIN, and called party telephone number to the calling card processing system 204 using standard DTMF tones as if it were a standard telephone. The internet gateway 123 may communicate this same information with the internet telephone system software 224 using ASCII characters input from a keyboard, data file, or other similar source. The internet gateway 123 will perform the necessary data translation operations using the communication protocol discussed below.

The hardware and software characteristics for one embodiment of the client PC workstation comprise:
- a Multimedia IBM-Compatible PC (including a full duplex sound card, speakers and microphone) or comparable system
- 14.4 bps or up modem
- internet Connection
- internet Browser—such as Microsoft's internet Explorer or Netscape's Navigator
- Web Telephony Software—such as Netspeak's Webphone—any H323 or SIP compliant system is acceptable.

The internet telephone system 224 software may be downloaded to the PC via the ISP 120 connection to the customer's PC. Execution of the software level check will be administered automatically at the time of user log on. The user will be notified of the software change and be provided with the necessary information to execute the software update via the internet.

Figure 3:
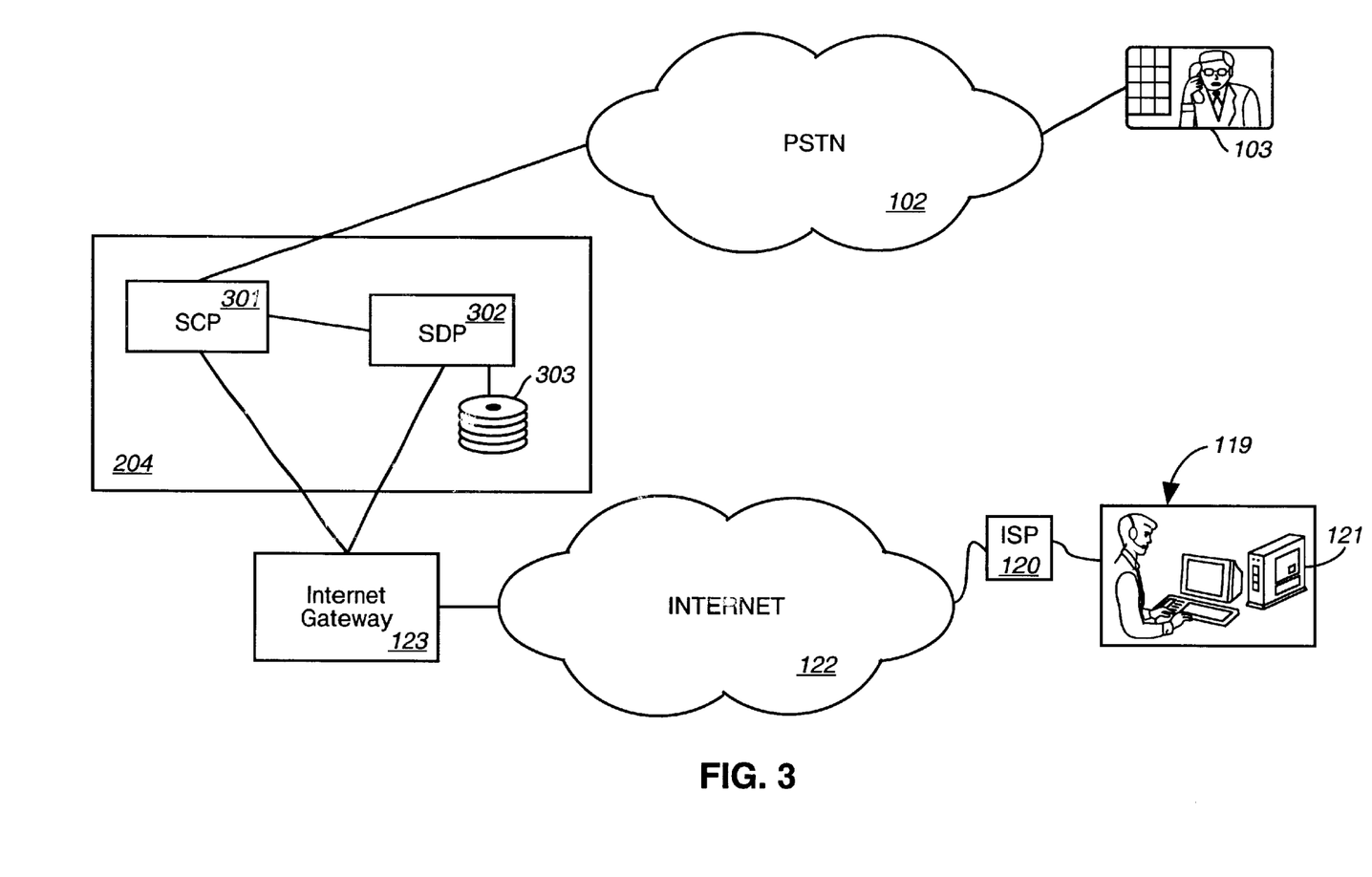
FIG. 3 illustrates a logical block diagram for a pre-paid calling card system attached to a PSTN and the internet according to yet another embodiment of the present invention.

Referring to FIG. 3, the calling card processing system 204 comprises a service control point (SCP) 301 coupled to a service data point (SDP) 302. The SDP 302 is coupled to a customer account database 303 used to store the account numbers, PINs, billing information, and calling amounts remaining for use by a customer. The calling party 119, using internet telephone system 224 (FIG. 2), connects to the SCP 301 in order to establish a call to the called party 103. The SCP 301 transmits queries to the SDP 302 as part of the account verification process. Once the account verification has completed successfully, the SCP 301 establishes a connection to the called party 103. Finally, the SCP 301 is responsible for maintaining account billing and balance information. Once the call between the calling party 119 and the called party 103 terminates, the SCP 301 communicates with the SDP 302 to update the corresponding balance entry for the calling card account used by the calling party 119 to complete the call. The SCP 301 is also responsible for monitoring the amount of time used during the call in order to timely terminate the call when the existing balance on the calling card has been completely used.

Figure 4:
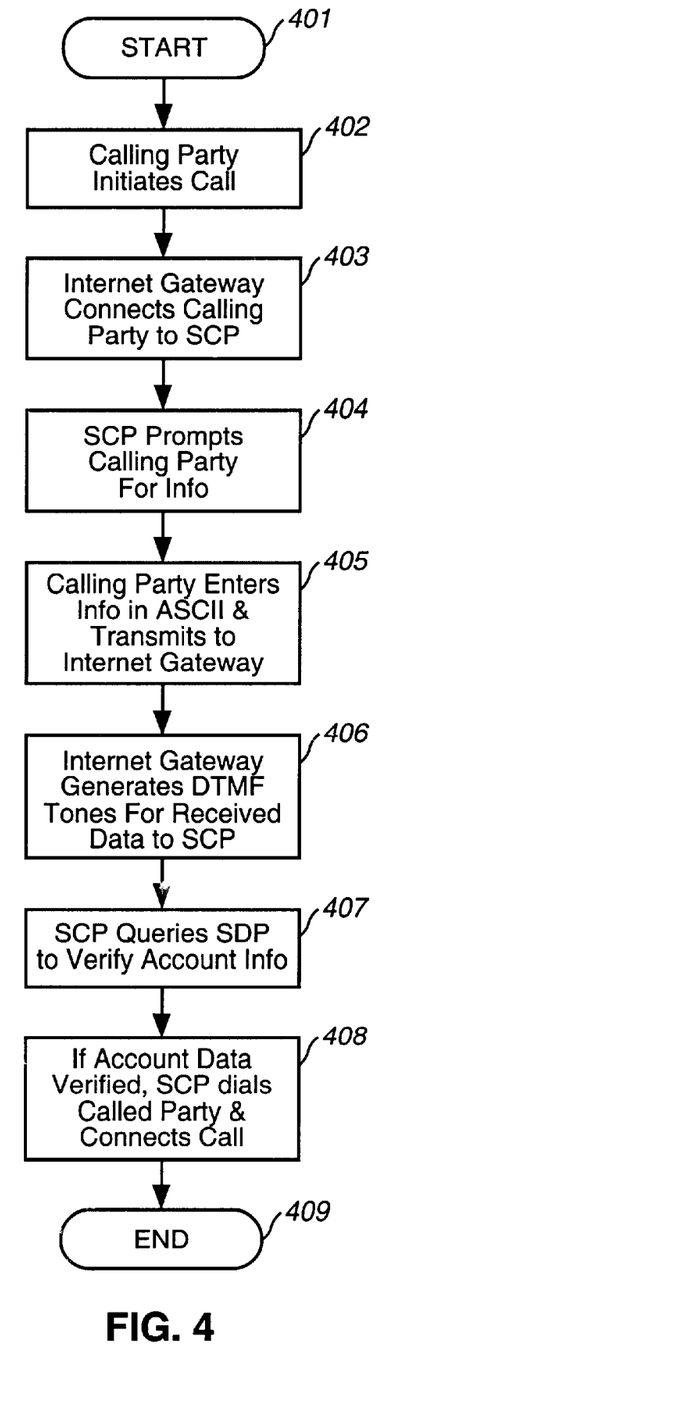
FIG. 4 illustrates a logical operation flow for an internet-based telephone call using a pre-paid calling card according to one embodiment of the present invention.

Referring to FIG. 4, the calling party 119 initiates a call at step 402. At step 403, the internet gateway connects the calling party 119 to the SCP 301. From this point forward, the SCP 301 will handle the call just as a call from a standard telephone. At step 404, the SCP 301 prompts the calling party 119 for account and call information. At step 405, calling party 119 keys in information from the PC keypad in operation 405. The IP Phone 224 software transfers the information in ASCII format to internet gateway 123 in operation 405. The internet gateway 123 generates the corresponding DTMF tones based on the information received from calling party's keypad in operation 406. SCP 301, in operation 407, queries the SDP 303 to verify the account information. Once the account information is verified, SCP 301 will out dial the called party's telephone number 103 in operation 408. Any time during the call, the calling party can enter DTMF input through the keypad. Additionally, at any time during the call, if any DTMF tone from SCP 301 is detected by the internet gateway 123, the internet gateway 123 translates the codes into ASCII characters and transmits them to the IP Phone software 224.

An extended software Keypad, with a corresponding display screen, which is running in the user's computer as part of IP Phone 224, will permit the calling party to easily enter any alphabetic and number information, such as address and name. The keypad will send this data in ASCII format to internet gateway 123 and the gateway 123 will translate them into standard DTMF digits for subsequent transmission to the calling card processor 204 through a voice channel. All characters (up to 72) in the standard key board can be mapped in this way, and they are backward compatible with the telephone keypad. All the extended mapping are transparent to the caller.

The following is the extended mapping for ASCII characters to DTMF tones:

| DTMF Digit | Standard Alphabetic mapping | Extended Mapping |
|---|---|---|
| 1 | | |
| 2 | ABC | ABCabc, '.'(dot), "(space), '-'(dash ) |
| 3 | DEF | DEFdef, '/'(slash), '@', '$', |
| 4 | GHI | GHIghi, |
| 5 | JKL | JKLjkl. |
| 6 | MNO | MNOmno |
| 7 | PQRS | PQRSpqrs |
| 8 | TUV | TUVtuv |
| 9 | WXYZ | WXYZwxyz |
| 0 | | |

Up to 72 (8×9) characters can be mapped to DTMF tones.

As an example, the address "2400 N. Glenville" will be translated:

2#4#0#0#28#62#27#41#56#35#65#86#46#56#56#35#

Once the internet gateway 123 detect any DTMF digits from SCP 301, the internet gateway 123 sends the detected digits to the IP Phone 224 running on the calling party's computer 121. The IP Phone 224 will display the received information on the screen. So the DTMF stream such as "2#4#0#0#28#62#27#41#56#35#65#86#46#56#56#35#" can be displayed as "2400 N. Glenville" in the screen.

In an alternate embodiment for the present invention, the DTMF encoder and decoder may be part of the IP Phone software 224 running on the calling party's computer 121. In this embodiment, the internet gateway 123 does not need to detect and generate DTMF tones. However, the preferred embodiment of permitting the internet gateway 123 to detect and generate. DTMF tones possesses an advantage that it eliminates the possibility of misinterpretation of DTMF digits due to the voice distortion out of internet congestion.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

The claimed invention is:

1. A method for providing a pre-paid telephone calling card services to a calling party initiating a voice-based connection to a called party telephone using an internet-based internet protocol ("IP") phone process running on a personal computer, the method comprising:

initiating an A-leg connection between the IP phone process and an internet gateway utilizing a computer network connecting the personal computer and the internet gateway;

establishing a telephone connection between the internet gateway and a SCP, wherein the SCP (Service Control Point) is coupled to a public switched telephone network;

transmitting a request by the SCP to the calling party through the IP phone process to provide account and call information;

receiving account and call information by the internet gateway from the IP phone process;

transmitting the information to the SCP by the internet gateway;

transmitting an account query from the SCP to verify account and balance information for the calling party;

if the account data is successfully verified, establishing a B-leg connection between the SCP and the called party telephone;

connecting the A-leg and B-leg connection to establish a voice-based connection between the calling party and the called party telephone; and if any DTMF tone from the SCP is detected by the internet gateway, the DTMF tone is translated to ASCII and forwarded to the calling party.

2. The method according to claim 1, wherein the account and call information comprises an account number, a personal identification number and a called party telephone number.

3. The method according to claim 2, wherein receiving account and call information comprises receiving account and call information encoded in ASCII characters.

4. The method according to claim 2, wherein the transmitting account and call information to the SCP comprises:

generating DTMF tones corresponding to ASCII characters received from the IP Phone process within the internet gateway; and transmitting the DTW tones from the internet gateway to the SCP.

5. The method according to claim 1, wherein the A-leg connection comprises an H.323 or SIP voice-based connection.

6. The method according to claim 1, wherein the B-leg connection comprises a connection through a public switched telephone network.

7. The method according to claim 4, wherein the transmitting an account query to a SDP (Service Data Point) to verify an account comprises;

transmitting a query by the SCP to the SDP, the query comprises an account number and a personal identification number;

comparing the account number and personal identification number with an account database coupled to the SDP; and verifying the account and balance information if the received account number and personal identification number matches the corresponding items within the database and the database possess a positive balance value.

8. The method according to claim 1, wherein the B-leg connection comprises a connection through a public switched telephone network.

9. The method according to claim 1, wherein the A-leg connection comprises a connection through the internet.

10. A system for providing a pre-paid telephone calling card services to a calling party initiating a voice-based connection to a called party telephone, comprising:

a computer for initializing an A-leg connection between the calling party and an internet gateway utilizing an IP phone process; a control processor coupled to a public switched telephone network wherein the SCP (Service Control Point) transmits a request to the calling party through the IP phone process to provide account and call information;

means for receiving account and call information by the internet gateway from the IP Phone process;

means for generating DTMF tones corresponding to ASCII characters received from the IP Phone process within the internet gateway;

means for transmitting the DTMF tones from the internet gateway to the SCP;

means for transmitting a query by the SCP to a SDP (Service Data Point), the query comprises an account number and a personal identification number;

means for comparing the account number and personal identification number with an account database coupled to the SDP;

means of verifying the account and balance information if the received account number and personal identification number matches the corresponding items within the database and the database possess a positive balance value;

if the account data is successfully verified, means for establishing a B-leg connection between the SCP and the called party telephone;

means for connecting the A-leg and B-leg connection in to establish the voice-based connection between the calling party and the called party telephone; and if any DTMF tone from the SCP is detected by the internet gateway, the DTMF tone is translated to ASCII and forwarded to the calling party.

11. A computer-readable medium having computer-executable instructions for the method recited in claim 7.

12. A computer data signal embodied in a carrier wave readable by a computing system and encoding a computer program of instructions for executing a computer process performing the method recited in claim 1.

13. A method for providing a pre-paid telephone calling card services to a calling party initiating a voice-based connection to a called party telephone using an internet-based internet IP Phone process running on a personal computer, the method comprising:

initiating an A-leg connection between the IP Phone process and an internet gateway utilizing a computer network connecting the personal computer and the internet gateway, the internet gateway responds by establishing a telephone connection between the internet gateway and a SCP (Service Control Point), the SCP is coupled to a public switched telephone network;

receiving a request from the SCP to the calling party through the IP Phone process to provide account and call information;

transmitting account and call information to the internet gateway by the IP Phone process, the internet gateway responds to receipt of account and call information by generating DTMF tones corresponding to ASCII characters received from the IP Phone and transmitting the DTMF tones to the SCP;

causing the SCP to transmit a query to a SDP (Service Data Point), the query comprises an account number and a personal identification number, the SDP responds to the query by comparing that account number and personal identification number with an account database coupled to the SDP and verifying the account and balance information if the received account number and personal identification number matches the corresponding items within the account database and the account database possess a positive balance value;

if the account data is successfully verified, causing the establishment of a B-leg connection between the SCP and the called party telephone, the SCP responds to the establishment of the B-leg connection by connecting the A-leg and B-leg connection to establish a voice-based connection between the calling party and the called party telephone; and if any DTMF tone from the SCP is detected by the internet gateway, the DTMF tone is translated to ASCII and forwarded to the calling party.

14. A computer-readable medium having computer-executable instructions for the method recited in claim 13.

15. A computer data signal embodied in a carrier wave readable by a computing system and encoding a computer program of instructions for executing a computer process performing the method recited in claim 13.

16. The method according to claim 13, wherein the B-leg connection comprises a connection through a public switched telephone network.

17. The method according to claim 13, wherein the B-leg connection comprises a connection through a public switched telephone network.

* * * * *

UNITED STATES PATENT AND TRADEMARK OFFICE
CERTIFICATE OF CORRECTION

PATENT NO. : 6,438,220 B1
DATED : August 20, 2002
INVENTOR(S) : Liu et al.

It is certified that error appears in the above-identified patent and that said Letters Patent is hereby corrected as shown below:

<u>Title page,</u>
Item [75], Inventor, after "(US)" insert -- Tong Liu, Ricahrdson, TX (US) --.

Signed and Sealed this

Seventeenth Day of December, 2002

JAMES E. ROGAN
*Director of the United States Patent and Trademark Office*